United States Patent [19]
Owens

[11] Patent Number: 6,050,224
[45] Date of Patent: Apr. 18, 2000

[54] THERAPEUTIC CHEW DEVICE FOR CLEANING TEETH AND BREATH OF DOGS

[75] Inventor: David M. Owens, Stanley, N.C.

[73] Assignee: American Cord & Twine, Stanley, N.C.

[21] Appl. No.: 09/246,069

[22] Filed: Feb. 8, 1999

[51] Int. Cl.$^7$ .................................................. A01K 29/00
[52] U.S. Cl. .......................................... 119/710; 119/709
[58] Field of Search .................................... 119/710, 709; D30/160

[56] References Cited

U.S. PATENT DOCUMENTS

| | | |
|---|---|---|
| D. 346,048 | 4/1994 | Jandebeur et al. . |
| D. 348,959 | 7/1994 | Lawson . |
| D. 356,879 | 3/1995 | O'Rourke . |
| D. 382,678 | 8/1997 | Weinacker, Jr. ................ D30/160 |
| 4,329,333 | 5/1982 | Barr .................................... 424/19 |
| 4,535,725 | 8/1985 | Fisher . |
| 4,924,811 | 5/1990 | Axelrod . |
| 5,033,410 | 7/1991 | Sigurdsson . |
| 5,092,272 | 3/1992 | O'Rourke . |
| 5,329,881 | 7/1994 | O'Rourke . |
| 5,392,734 | 2/1995 | Laone et al. . |
| 5,560,320 | 10/1996 | Plunk ................................. 119/709 |

*Primary Examiner*—Peter M. Poon
*Assistant Examiner*—Yvonne Abbott
*Attorney, Agent, or Firm*—Kennedy Covington Lobdell & Hickman, LLP

[57] ABSTRACT

A therapeutic chew device for aiding against periodontal disease in dogs which includes a length of rope formed of a plurality of polyester yarns with knots near the opposite ends of the rope and a chewable rawhide disk, including a compressed rawhide chew impregnated with activated charcoal, attached to the length of rope between the two knot. As the dog chews on the rope, the plurality of polyester yarns massage and stimulate the gums while individual loose yarn ends provide cleaning and flossing action for the teeth. In addition, as the dog chews on the charcoal impregnated rawhide disk, the activated charcoal is slowly released and absorbs odors and bacteria to clean and freshen the dog's breath.

6 Claims, 2 Drawing Sheets

THERAPEUTIC CHEW DEVICE FOR CLEANING TEETH AND BREATH OF DOGS

BACKGROUND OF THE INVENTION

The present invention relates generally to dog chew toys and, more particularly, to a therapeutic chew device for cleaning dogs' teeth and freshening dogs' breath when chewed.

According to the American Veterinary Dental Society, studies show that more than 80% of dogs by age three show some signs of gum disease. Because many dogs have bad breath, it is common for dog owners to believe that bad dog breath is normal. However, bad breath could be an early warning sign of the dangerous gum disease gingivitus. In general, the problem begins when plaque and tartar are allowed to build up on a dog's teeth. Plaque harbors the bacteria which can infect gum tissue and the roots of the teeth. As periodontal disease progresses, the dog's gums start to bleed and bacteria begins to grow in the crevices created around the teeth causing infection which can travel into the dog's bloodstream where the heart, liver and kidney can be affected. Due to the loss of supporting muscle and bone structure, chronic periodontal disease often causes the dog's teeth to fall out. In addition, a dog that has periodontal disease may suffer from loss of appetite, pain and disease of other organs. Thus, it is extremely important for dog owners to provide regular dental care for their dogs.

Prevention is the key to helping dogs maintain good oral health. In addition to a complete dental exam by a veterinarian and regular veterinary dental check-ups, a home dental care routine is important for preventing periodontal disease in dogs. Veterinarians stress the importance of a preventative dental care routine which includes cleaning the dog's teeth regularly. While effective pet formulated toothpastes are available, brushing a dog's teeth regularly is typically not popular with dogs or dog owners However, there are many other producavailable to help clean dogs' teeth such as oral rinses and pills, specialized dog food and dog chew toys. Because dogs have a natural chewing instinct, dog chew toys are particularly well-suited for helping to clean dogs' teeth. Examples of dog chew toys designed to help clean dogs' teeth are shown in U.S. Pat. No. 4,924,811 issued to H. R. Axelrod on May 15, 1990 and U.S. Pat. No. 5,329,881 issued to A. O'Rourke on Jul. 19, 1994.

While products for dog dental care are available, one problem that persists is bad dog breath. Dog owners have tried many oral and breath care products including oral drops and pills and spearmint flavored chews in efforts to eliminate bad dog breath. However, these products may only temporarily mask or cover up the problem and fail to produce long lasting results. Thus, there is a need for a dog breath freshener which effectively cleans dogs' breath and eliminates odors.

Charcoal has long been recognized for its cleansing and healing properties. A natural deodorant and disinfectant, activated charcoal is one of the finest absorptive and adsorptive agents known and has been used by physicians and natural healers throughout the world for centuries. Activated charcoal is derived from natural carbonaceous materials such as wood, peat and coconut shells. This odorless, tasteless vegetable form of carbon is completely safe for consumption and, orally administered, has many beneficial uses including neutralizing drugs and poisons, providing intestinal gas relief and preventing intestinal infections. In addition, activated charcoal has been beneficial for industrial uses, air and water purification, and purification of foodstuffs, chemicals and pharmaceuticals.

Therefore, there is a need for a device which helps clean dogs' teeth without requiring a dog owner to brush the dog's teeth or administer pills or drops and which includes activated charcoal for cleansing and freshening the dog's breath.

SUMMARY OF THE INVENTION

The present invention is directed to a therapeutic chew device for aiding against periodontal disease in dogs while providing a safe, non-toxic, fun chew toy which satisfies a dog's natural chewing needs. The therapeutic chew device includes a length of rope having a chewable charcoal impregnated disk and is specifically designed to clean a dog's teeth and clean and freshen a dog's breath as the dog chews on the toy.

In the preferred embodiment, the length of rope is formed of a plurality of polyester yarns and has knots adjacent each end of the rope with loose yarn ends extending outward from the knots. Although other deniers may be used, the preferred denier used in manufacturing the therapeutic chew device is 1000. As the dog chews on the rope, the polyester yarn ends are pulled through the spaces between the teeth and provide cleaning and flossing action for the teeth while also massaging and stimulating the gums to keep the gum tissue clean and healthy. In the preferred embodiment, industrial grade tenacity polyester is used. The polyester yarns possess smooth, silky strands that can be easily pulled between a dog's teeth during play, thus creating a flossing action which removes food particles from between the dog's teeth to promote tooth and gum health. In addition, polyester resists yellowing and remains bright to attract the dog to play more often. Because dogs love to chew rope, it provides hours of enjoyment and regular cleaning of the dog's teeth. Thus, the present invention provides a long lasting, inexpensive, effective means for helping dogs to maintain good oral health.

In the preferred embodiment, the chewable charcoal impregnated disk is a compressed rawhide chew impregnated with activated charcoal and attached to the rope between the two knots. The preferred disk is made by mixing food-grade FDA approved charcoal with water in a saltwater solution and then pressed into various shapes and sizes before drying. The preferred disk has a rough exterior surface and a through hole extending through the disk for receiving the rope therethrough before the rope end is tied, thereby attaching the disk to the rope. Rawhide chews are well known natural dog treats loved by dogs for their taste and texture. Because activated charcoal is odorless and tasteless and safe for consumption, impregnating a rawhide chew with activated charcoal does not diminish its attractiveness to dogs and it is safely consumed along with the rawhide treat. As the dog chews on the charcoal impregnated rawhide disk, the activated charcoal is slowly released and absorbs odors and bacteria to clean and freshen the dog's breath. In addition, the charcoal will often deliver acid naturalization properties to the dog's stomach and digestive track.

Other features, characteristics and advantages are described below with reference to the accompanying drawings and/or will be apparent therefrom to persons of skill in the art.

DESCRIPTION OF THE PREFERRED EMBODIMENT

Figure 1:
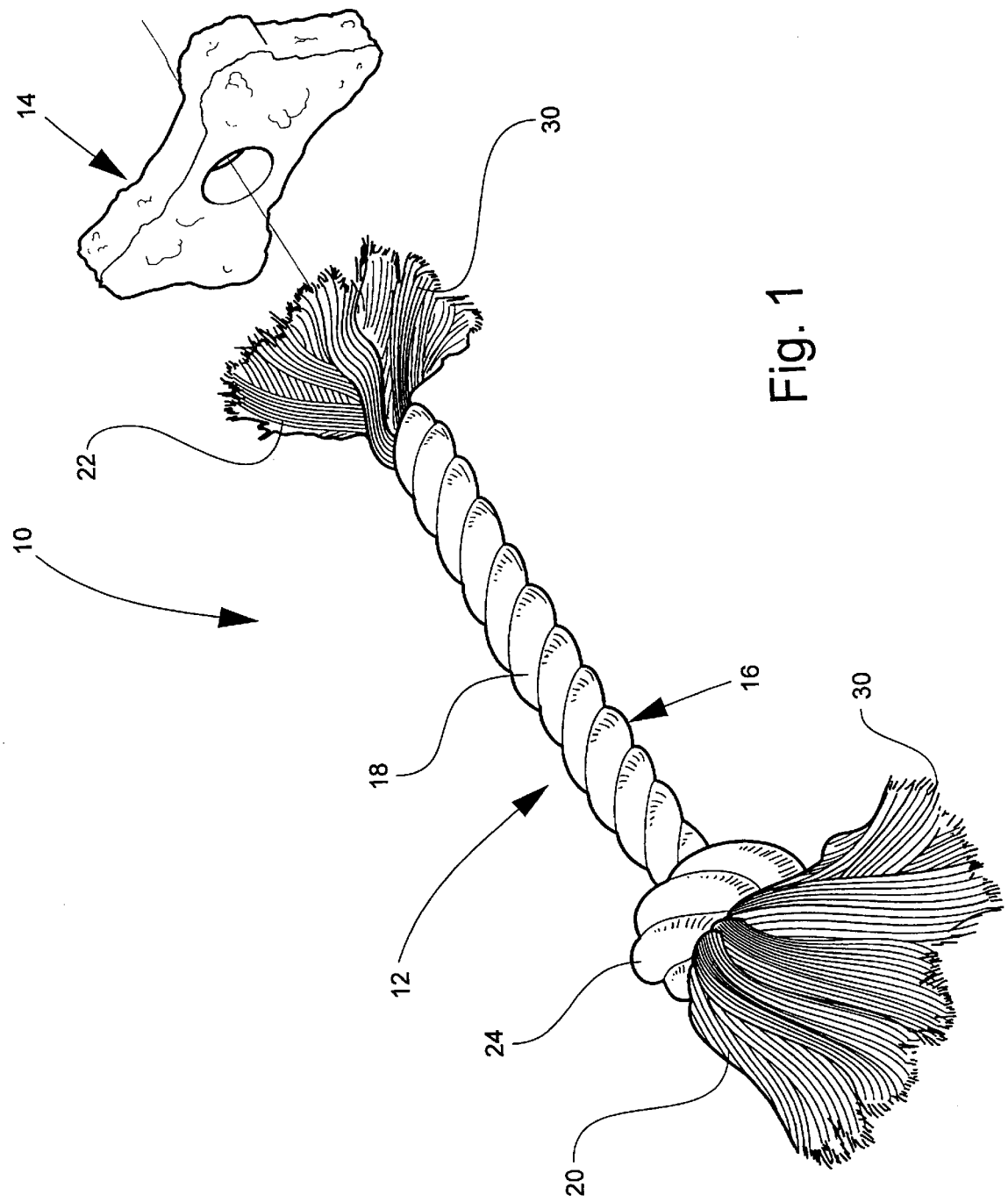
FIG. 1 is a perspective view of a length of polyester rope with a knot at one end separate from a charcoal impregnated disk in position to be mounted on the rope to form the preferred embodiment of the therapeutic chew device of the present invention.

Referring now to the accompanying drawings and initially to FIG. 1, the therapeutic chew device of the preferred embodiment of the present invention is designated generally by the reference numeral 10. The therapeutic chew device 10 comprises a length of rope 12 including means for cleaning and flossing a dog's teeth as the dog chews on the length of rope and a compressed rawhide disk 14 including means for cleaning and freshening a dog's breath as the dog chews on the rawhide disk 14.

In the preferred embodiment, the length of rope 12 is formed of a plurality of polyester yarns 16 which is braided and has a midsection 18 and opposite ends 20, 22 including knots 24 adjacent each end 20, 22 of the length of rope 12. As shown in FIG. 1, adjacent to the knots 24, the polyester yarns 16 extend loosely outward from the knots 24 forming a cluster of individual loose yarn ends 30. As the dog chews on the rope, the loose yarn ends 30 at each end 20, 22 provide cleaning and flossing action for the teeth while the polyester yarns 16 at the midsection 18 of the length of rope 12 also massage and stimulate the gums of the dog, combining to provide the means for cleaning and flossing a dog's teeth.

Figure 2:
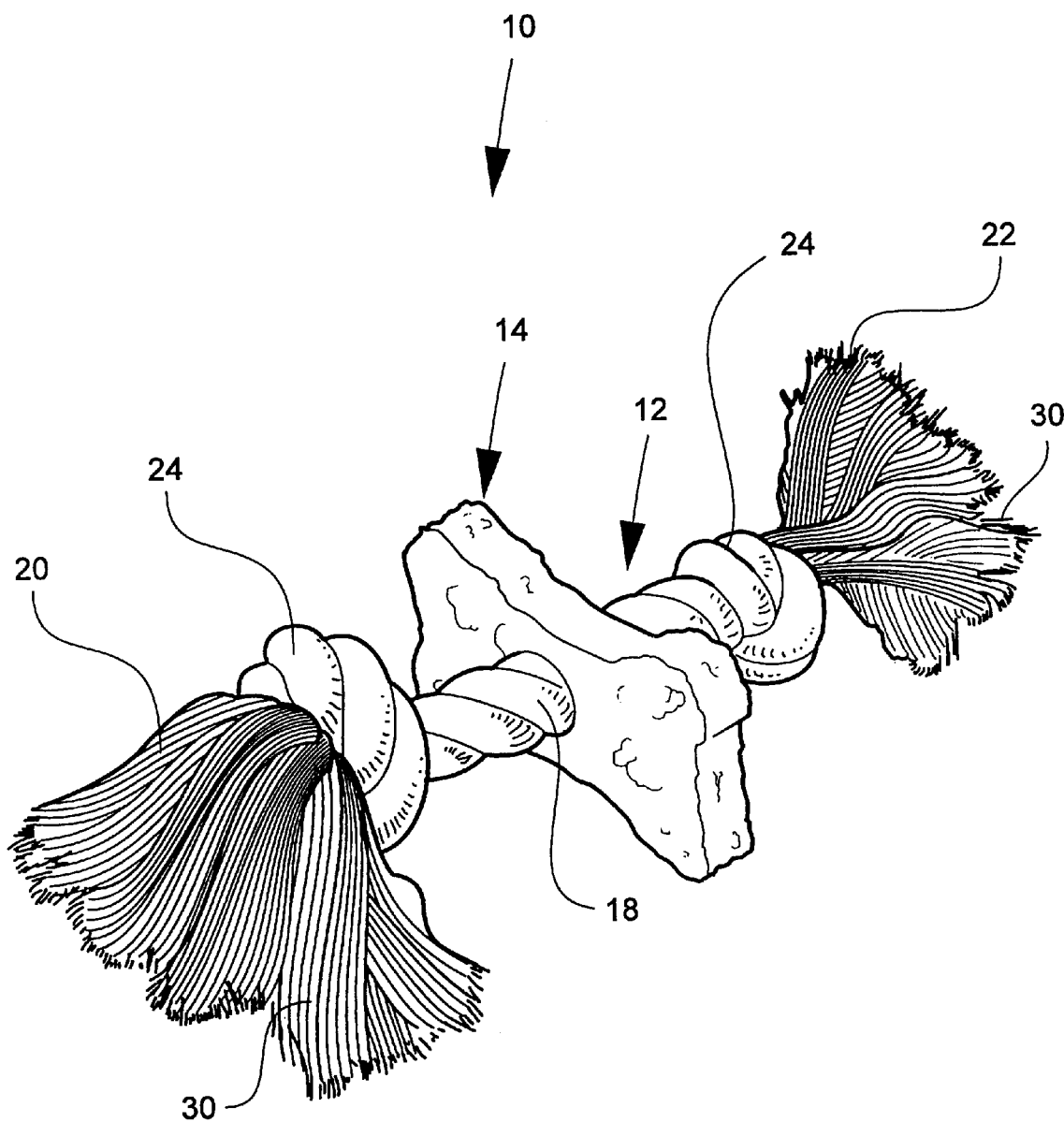
FIG. 2 is a perspective view of the length of rope and the charcoal impregnated disk of FIG. 1 assembled.

In the preferred embodiment, the chewable rawhide disk 14 is a compressed rawhide chew impregnated with activated charcoal 26 and attached to the length of rope 12 between the two knots 24. The rawhide disk 14 is made by mixing the activated charcoal 26, such as, by way of example, food-grade FDA approved charcoal, with water in a saltwater solution. The mixture is then pressed into various shapes and sizes before drying. As illustrated in FIG. 1, the preferred disk 14 has a rough exterior surface and a through hole 28 extending through the disk 14 for receiving the length of rope 12 therethrough and attaching the disk 14 to the rope 12, as shown in FIG. 2. The therapeutic chew device 10 is ass ed by inserting an unknotted end 22 of the length of rope 12 through the through hole 28 and sliding the disk 14 onto the midsection 18, prior to forming the knot 24 adjacent to that end. As the dog chews on the charcoal impregnated rawhide disk, it slowly disintegrates with the result that the activated charcoal is slowly released and absorbs odors and bacteria to clean and freshen the dog's breath. The odorless, tasteless charcoal is a natural deodorant and disinfectant and is an excellent means for cleaning and freshening a dog's breath. Moreover, because dogs love to chew rawhide chews, the therapeutic chew device 10 of the present invention provides an easy and effective means for cleaning dogs' breath and eliminating odors without requiring dog owners to administer pills or drops or purchase special food or costly treats for their dogs which may not resolve the problem but only temporarily mask the dogs' bad breath. When a dog has consumed the rawhide disk 14, the dog may still satisfy its chewing needs with the length of rope 12 which continues to provide cleaning and flossing action when chewed by the dog. Thus, the good oral health of the dog's teeth is maintained regardless of whether the dog's owner immediately replaces or waits to replace the remaining length of rope 12 with another therapeutic chew device 10 which includes a charcoal impregnated rawhide disk 14.

It will therefore be readily understood by those persons skilled in the art that the present invention is susceptible of a broad and utility application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to one contemplated embodiment, it is to be understood that this disclosure is only illustrative and exemplary of the present invention and is made merely for purposes of providing a full and enabling disclosure of the invention. The foregoing disclosure is not intended nor to be construed to limit the present invention or otherwise to exclude any such other embodiments, adaptations, variations, modifications and equivalent arrangements.

What is claimed:

1. A therapeutic chew device for cleaning teeth and breath of dogs comprising: a length of rope formed of a plurality of polyester yarns and a chewable disk attached to said rope, said disk being impregnated with charcoal whereby upon being chewed by a dog, said charcoal impregnated disk cleans and freshens a dog's breath.

2. The therapeutic chew device of claim 1, wherein said length of rope has opposite ends and loose yarn ends at at least one end of said rope whereby upon being chewed by a dog, said polyester yarns clean and floss a dog's teeth and massage a dog's gums.

3. The therapeutic chew device of claim 2, wherein said length of rope is braided and has a knot adjacent each end whereby said loose yarn ends extend outward adjacent to said knots.

4. The therapeutic chew device of claim 1, wherein said chewable disk is a rawhide chew.

5. The therapeutic chew device of claim 1, wherein said rawhide chew is a compressed rawhide chew.

6. The therapeutic chew device of claim 5, wherein said chewable disk includes a through hole for receiving said rope therethrough thereby attaching said disk to said rope.

* * * * *